United States Patent
Zhang et al.

(10) Patent No.: US 11,835,392 B2
(45) Date of Patent: Dec. 5, 2023

(54) APPARATUS, SYSTEM AND METHOD FOR TEMPERATURE MEASUREMENT FOR DRY-TYPE TRANSFORMER

(71) Applicant: HITACHI ENERGY LTD, Zürich (CH)

(72) Inventors: YiBo Zhang, Beijing (CN); Delun Meng, Beijing (CN); Jiansheng Chen, Beijing (CN); Chun Li, Beijing (CN)

(73) Assignee: HITACHI ENERGY LTD, Zürich (CH)

( * ) Notice: Subject to any disclaimer, the term of this patent is extended or adjusted under 35 U.S.C. 154(b) by 727 days.

(21) Appl. No.: 16/963,210

(22) PCT Filed: Jan. 19, 2018

(86) PCT No.: PCT/CN2018/073447
§ 371 (c)(1),
(2) Date: Jul. 18, 2020

(87) PCT Pub. No.: WO2019/140643
PCT Pub. Date: Jul. 25, 2019

(65) Prior Publication Data
US 2021/0131876 A1    May 6, 2021

(51) Int. Cl.
*G01K 1/024* (2021.01)
*G01K 1/14* (2021.01)
(Continued)

(52) U.S. Cl.
CPC ............... *G01K 1/024* (2013.01); *G01K 1/14* (2013.01); *G01K 3/005* (2013.01); *G05B 15/02* (2013.01);
(Continued)

(58) Field of Classification Search
CPC .......... G01K 1/024; G01K 1/14; G01K 3/005; G05B 15/02; H01F 27/085; H01F 27/402;
(Continued)

(56) References Cited

U.S. PATENT DOCUMENTS 6,808,669 B2* 10/2004 Kim ...................... H05B 6/662
264/272.2
2010/0315190 A1* 12/2010 Haj-Maharsi ........... H01F 27/40
336/192
(Continued)

FOREIGN PATENT DOCUMENTS

CN      201837467 U    5/2011
CN      203432691 U    2/2014
(Continued)

OTHER PUBLICATIONS

Notice of Reasons for Refusal, Japanese Patent Application No. 2020-539729, dated Jan. 4, 2022, 18 pages.
(Continued)

*Primary Examiner* — Ziaul Karim
(74) *Attorney, Agent, or Firm* — Sage Patent Group

(57) ABSTRACT

An apparatus includes a temperature sensor configured to measure a temperature of a dry-type transformer, and the temperature sensor is arranged on or proximate a conductor of the dry-type transformer and is covered by an insulating layer of the conductor. The apparatus further includes a passive wireless communication module configured to transmit the measured temperature to a reader. The temperature of the dry-type transformer can be measured accurately, thereby improving the reliability and safety of the dry-type transformer. Accordingly, temperature measurement for the dry-type transformer can work appropriately in a cost-effective and efficient way.

15 Claims, 3 Drawing Sheets

(51) Int. Cl.
*G01K 3/00* (2006.01)
*G05B 15/02* (2006.01)
*H01F 27/08* (2006.01)
*H01F 27/40* (2006.01)
*H04Q 9/00* (2006.01)

(52) U.S. Cl.
CPC ......... *H01F 27/085* (2013.01); *H01F 27/402* (2013.01); *H04Q 9/00* (2013.01); *H01F 2027/406* (2013.01); *H04Q 2209/47* (2013.01)

(58) Field of Classification Search
CPC ............. H01F 2027/406; H01F 27/327; H01F 2027/328; H01F 27/40; H04Q 9/00; H04Q 2209/47
See application file for complete search history.

(56) References Cited

U.S. PATENT DOCUMENTS

| | | | | |
|---|---|---|---|---|
| 2012/0092114 | A1* | 4/2012 | Matthews | H01F 27/402 336/107 |
| 2014/0049880 | A1* | 2/2014 | Kohler | H01F 27/402 361/677 |
| 2017/0054923 | A1* | 2/2017 | Thompson | G01J 5/0096 |
| 2020/0378836 | A1* | 12/2020 | Maxwell | H01F 27/402 |

FOREIGN PATENT DOCUMENTS

| | | |
|---|---|---|
| CN | 103971885 A | 8/2014 |
| CN | 204375540 U | 6/2015 |
| CN | 204788675 U | 11/2015 |
| CN | 205719283 U | 11/2016 |
| CN | 106876114 A | 6/2017 |
| CN | 206489953 U | 9/2017 |
| CN | 107589329 A | 1/2018 |
| DE | 20016300 U1 | 5/2001 |
| GB | 2539195 A | 12/2016 |
| JP | H7-161550 A | 6/1995 |
| JP | 2007-261664 A | 10/1995 |
| JP | 2001-044052 A | 2/2001 |
| JP | 2012-243913 A | 12/2012 |
| JP | 2013-004776 A | 1/2013 |
| JP | 2013-162009 A | 8/2013 |
| JP | 2015-103627 A | 6/2015 |
| JP | 2016-191613 A | 11/2016 |
| KR | 10-0358580 | 10/2002 |
| WO | WO 2017/206110 A1 | 12/2017 |

OTHER PUBLICATIONS

International Search Report and Written Opinion of the International Searching Authority, PCT/CN2018/073447, dated Oct. 17, 2018, 9 pages.

Chinese Search Report dated Jan. 4, 2021, Chinese Patent Application No. 201880087375.2, 3 pages.

Third Office Action, Chinese Patent Application No. 2018800873752, dated Nov. 16, 2021, 15 pages.

Notice of Reasons for Refusal, Japanese Patent Application No. 2020-539729, dated Aug. 12, 2021, 11 pages.

Notice of Grounds for Rejection, Korean Patent Application No. 10-2020-7020786, dated Dec. 22, 2021, 5 pages.

Yang, S., "Advanced Sensing Technology," Jan. 31, 2014, pp. 148-149, University of Science and Technology of China Press, English-language Abstract of Textbook, 5 pages.

* cited by examiner

APPARATUS, SYSTEM AND METHOD FOR TEMPERATURE MEASUREMENT FOR DRY-TYPE TRANSFORMER

CROSS REFERENCE TO RELATED APPLICATIONS

This application is a 35 U.S.C. § 371 national stage application of PCT International Application No. PCT/CN2018/073447 filed on Jan. 19, 2018, the disclosure and content of which is incorporated by reference herein in its entirety.

FIELD

Example embodiments disclosed herein generally relate to temperature measurement and more particularly, to a measuring apparatus and system for measuring a temperature of a dry-type transformer.

BACKGROUND

A transformer is an electrical device that transfers electrical energy between two or more circuits through electromagnetic induction, and the transformer is generally divided into an oil-type transformer and a dry-type transformer (also referred to as dry transformer). The oil-type transformer uses insulation oil as the insulation material, while the dry-type transformer is one in which the transformer core and coils are not immersed in a liquid. That is, in the dry-type transformer, air is used as the cooling medium instead of oil.

Generally speaking, the dry-type transformer can be designed to operate at higher temperatures than oil-type transformer. During the operation of the dry-type transformer, a temperature of the dry-type transformer may rise as high as for example 180° C. Thus, it is necessary to monitor the operation status of the dry-type transformer to ensure safety and power quality.

Traditionally, a wired thermal couple is used to measure a temperature of the dry-type transformer, which is very inconvenient. Moreover, traditional ways cannot obtain the accurate temperature of the dry-type transformer, and it is very costly to measure the temperature of the dry-type transformer. Accordingly, traditional ways for measuring the temperature of the dry-type transformer are inaccurate and inefficient.

SUMMARY

Example embodiments disclosed herein propose a solution for measuring temperature of the dry-type transformer using a passive wireless measuring apparatus.

In a first aspect, example embodiments disclosed herein provide a measuring apparatus. The measuring apparatus comprises a temperature sensor configured to measure a temperature of a dry-type transformer, and the temperature sensor is arranged on or approximate to a conductor of the dry-type transformer and is covered by an insulating layer of the conductor. The measuring apparatus further comprises a passive wireless communication module configured to transmit the measured temperature to a reader.

In some embodiments, the insulating layer is formed by wrapping an insulating material, preferably an epoxy resin, on the conductor and the temperature sensor, and the conductor is one of the followings: a high voltage (HV) winding of the dry-type transformer, a low voltage (LV) winding of the dry-type transformer, a core of the dry-type transformer, and a tap terminal of the dry-type transformer.

In some embodiments, the passive wireless communication module is connected to the temperature sensor via a wire, and one end of the wire protrudes from the insulating layer.

In some embodiments, the temperature sensor is arranged on an upper part of the HV winding or the LV winding along the core.

In some embodiments, the passive wireless communication module is arranged on or inside a dome area of the HV winding, and preferably, near a tap changer or a wire connection terminal on the dome area.

In some embodiments, the passive wireless communication module is covered by an insulating layer of the dome area, or arranged inside a groove of the dome area, and a part of the wire is arranged in the groove for connecting the passive wireless communication module and the temperature sensor.

In some embodiments, the temperature sensor is connected to the conductor via a thermally conductive layer within the insulating layer.

In some embodiments, the temperature sensor is packaged inside the passive wireless communication module, and a terminal of the temperature sensor is exposed outside the passive wireless communication module. Moreover, the insulating layer is formed by wrapping an insulating material, preferably an epoxy resin, on the conductor and the passive wireless communication module.

In some embodiments, the measuring apparatus is made of soft material and arranged on a curved surface of the dry-type transformer, preferably covered by an insulating layer of the curved surface.

In some embodiments, the passive wireless communication module includes a passive radio frequency identification (RFID) tag or a surface acoustic wave (SAW) tag.

In a second aspect, example embodiments disclosed herein provide a system for measuring a temperature of a dry-type transformer. The system comprises the measuring apparatus of the first aspect, the reader, and the dry-type transformer.

In some embodiments, the reader is arranged inside the dry-type transformer, preferably in a low voltage (LV) compartment of the dry-type transformer.

In some embodiments, the reader is configured to provide wireless radio frequency energy to power the measuring apparatus via one or more antennas.

In some embodiments, the system further comprises one or more antennas configured to receive the measured temperature from the passive wireless communication module, and at least one of the one or more antennas is arranged in middle of the dry-type transformer to enable a wireless communication between the at least one antenna and the passive wireless communication module.

In some embodiments, the system further comprises a further measuring apparatus of the first aspect arranged at a different location from the measuring apparatus.

In some embodiments, the system further comprises a controller configured to, in response to the measured temperature being above a predefined threshold, turn on a cooling device to decrease the temperature of the dry-type transformer.

In a third aspect, example embodiments disclosed herein provide use of measuring apparatus of the first aspect for measuring a temperature of a dry-type transformer.

In a fourth aspect, example embodiments disclosed herein provide a method for installing a measuring apparatus. The method comprises assembling the temperature sensor of the measuring apparatus of the first aspect to a surface of a conductor of a dry-type transformer and wrapping an insulating material on the conductor and the temperature sensor such that the temperature sensor is non-detachable.

In a fifth aspect, example embodiments disclosed herein provide a method for detaching a measuring apparatus. The method comprises detaching the passive wireless communication module of the measuring apparatus of the first aspect from a groove of a dome area. The method further comprises assembling a new passive wireless communication module in the groove of the dome area and connecting the new passive wireless communication module to a wire which is arranged in the groove.

According to the embodiments of the present disclosure, the temperature of the dry-type transformer can be measured accurately, thereby improving the reliability and safety of the dry-type transformer. Accordingly, the temperature measurement for the dry-type transformer can work appropriately in a cost-effective and efficient way.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or like reference numbers refer to the same or like elements.

DETAILED DESCRIPTION

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being configured to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. Other definitions, explicit and implicit, may be included below.

Traditionally, a wired thermal couple is used to measure a temperature of the dry-type transformer, and the measuring probe is generally located in the air duct. However, the wired measuring apparatus is very inconvenient, which will cause the line arrangement to be complex, and a battery is often required to power the wired measuring apparatus. In addition, traditional measuring apparatus cannot obtain the accurate temperature of the dry-type transformer and the hot pot temperature the dry-type transformer, and it is generally costly to measure the temperature of the dry-type transformer. Accordingly, traditional ways for measuring the temperature of the dry-type transformer are inaccurate and inefficient.

In general, according to embodiments of the present disclosure, there is provided a measuring apparatus and system for measuring a temperature of a dry-type transformer, which can measure the temperature of the dry-type transformer accurately. Moreover, the proposed measuring apparatus is passive and wireless; thus, the measuring apparatus can be arranged flexibly in the dry-type transformer, and the reliability and safety of the dry-type transformer can be also improved. Accordingly, according to embodiments of the present disclosure, temperature measurement for dry-type transformer can work in a cost-effective and efficient way. Some example embodiments of the present disclosure are described below with respect to FIGS. 1-6.

Figure 1:
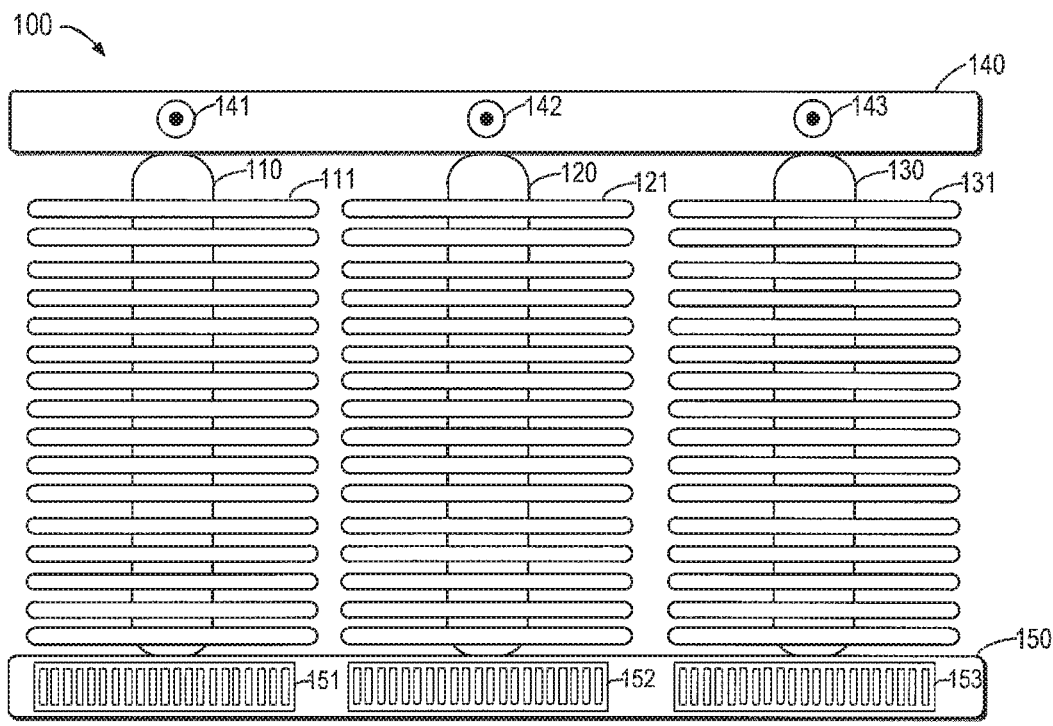
FIG. 1 illustrates a schematic diagram of an example of a dry-type transformer.

FIG. 1 illustrates a schematic diagram of an example of a dry-type transformer 100. As shown in FIG. 1, the dry-type transformer 100 is a three-phase dry-type transformer with the cabinet removed, which uses three groups of conductors to generated three-phase alternating current. Each of the three groups comprises a core, a low voltage (LV) winding or coil (not shown), and a high voltage (HV) winding or coil. For example, the first group comprises a core 110 and a HV winding 111, the second group comprises a core 120 and a HV winding 121, and the third group comprises a core 130 and a HV winding 131.

Generally, since the dry-type transformer 100 uses air as the cooling medium instead of oil, insulation is necessary between conductors of dry-type transformer 100, and thus each conductor may be casted with an insulating layer. For the LV winding and HV winding, a varying current in one winding produces a varying magnetic field, which in turn induces a voltage in another winding. Accordingly, power can be transferred between the windings through the magnetic field without a metallic connection between the windings.

Still in reference to FIG. 1, the dry-type transformer 100 further comprises an upper clamp 140 and a lower clamp 150. In the upper clamp 140, there are arranged with a plurality of HV terminals, such as HV terminals 141, 142 and 143. One or more cooling devices are arranged near the lower clamp 150 so as to cool the dry-type transformer 100 together or separately. Examples of the cooling devices comprise, but are not limited to, fans 151, 152 and 153.

It is to be understood that the dry-type transformer 100 can comprise one or more further components other than those as shown in FIG. 1. It is also to be understood that although the example dry-type transformer 100 is shown in FIG. 1, the protection scope of the present disclosure is not limited to the example dry-type transformer 100. Additionally, although the three-phase dry-type transformer is shown as an example, other-phase (such as a single-phase) dry-type transformer may be also possible.

Figure 2:
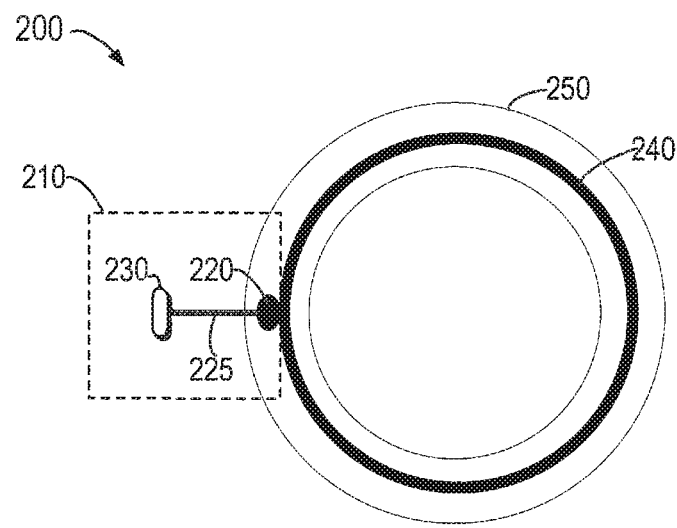
FIG. 2 illustrates a schematic diagram of an environment in which a measuring apparatus is used to measure a temperature of a dry-type transformer.

FIG. 2 illustrates a schematic diagram of an environment 200 in which a measuring apparatus is used to measure a temperature of a dry-type transformer. As shown in FIG. 2, a measuring apparatus 210 is used to measure a temperature of a conductor 240, the conductor 240 may be any conductor in the dry-type transformer 100 with reference to FIG. 1, including but not limited to the HV windings 111, 121, 131 of the dry-type transformer 100, the LV windings of the dry-type transformer 100, the cores 110, 120, 130 of the dry-type transformer 100, tap terminals, HV outlets, LV outlets and so on.

As shown in FIG. 2, the measuring apparatus 210 comprises a temperature sensor 220 and a passive wireless communication module 230. The temperature sensor 220 is configured to measure a temperate of a location of the dry-type transformer 100 where the temperature sensor 220 is located. The passive wireless communication module 230 is configured to transmit the measured temperature to a reader. According to embodiments of the present disclosure, the measuring apparatus 210 does not have any power source circuit, but instead uses the received wireless radio frequency energy to power itself. Thus, embodiments as described herein are significantly different from the traditional solutions in terms of the power up and communication mechanisms.

In some embodiments, the temperature sensor 220 may be a thermal couple or a thermistor, and it is arranged on or proximate the conductor 240 so as to directly obtain the temperature of the conductor 240. In those embodiments where the temperature sensor 220 is proximate the conductor 240, a thermally conductive layer may be arranged between the temperature sensor 220 and the conductor 240. In this way, the temperature sensor 220 and the conductor 240 can be well connected so as to obtain the accurate temperature of the conductor 240. Since the temperature sensor 220 is directly located on the conductor, it can respond to the temperature rise in real time and monitor the temperature accurately.

As shown in FIG. 2, the conductor 240 has an insulating layer 250 for insulation, and the temperature sensor 220 is arranged to be covered by the insulating layer 250 of the conductor 240. In some embodiments, the insulating layer 250 is formed by wrapping an insulating material on the conductor 240 and the temperature sensor 220. For example, the insulating layer 250 may be formed by casting an epoxy resin on the conductor 240 and the temperature sensor 220. For another example, the insulating layer 250 may be formed by winding an insulation tape on the conductor 240 and the temperature sensor 220. In this way, the temperature sensor 220 can be arranged for measurement during the manufacturing of the dry-type transformer 100, which will not change the appearance of the dry-type transformer 100. In addition, since the epoxy resin is a polymer material that can be used as a high voltage insulator and it has a high volume resistivity, lighter, high insulation strength and good mechanical strength, it is suitable for serving as the insulating layer 250.

In some embodiments, the temperature sensor 220 may be connected to the passive wireless communication module 230 via a wire 225. One end of the wire 225 may protrude from the insulating layer 250, as shown in FIG. 2. In this way, if the passive wireless communication module 230 is not heat resistant, it can be arranged to be separated from the temperature sensor 220 which is directly located on the conductor 204 and may have a very high temperature. Moreover, since the passive wireless communication module 230 will probably break down during the operation, arranging such a module outside the dry-type transformer 100 would be beneficial to its reparation. It is to be understood that if the passive wireless communication module 230 is made of heat resistant material, it is not necessary to be separated from the temperature sensor 220. An embodiment where the passive wireless communication module and the temperature sensor are arranged together is described below with reference to FIG. 4.

The passive wireless communication module 230 can transmit the measured temperature obtained from the temperature sensor 220 to a reader through wireless communication. Moreover, since the passive wireless communication module 230 is passive, it does not need any battery or power wire to work. Instead, the passive wireless communication module 230 can obtain wireless radio frequency energy from the reader so as to power the measuring apparatus 210.

The passive wireless communication module 230 comprises an antenna for wireless communication. In some embodiments, the passive wireless communication module 230 may comprise a passive radio frequency identification (RFID) tag or a surface acoustic wave (SAW) tag. RFID uses electromagnetic fields to automatically identify and track tags attached to objects and is suitable for serving as the passive wireless communication module. A RFID tag would be beneficial since it is safe and flexible and it needs no maintenance due to no battery and no replacement and it is cost-effective. In addition, the RFID tag is small in size, and thus the measuring apparatus can be positioned at a lot of different locations in the dry-type transformer. SAW is a class of microelectromechanical systems (MEMS) which rely on the modulation of surface acoustic waves to sense a physical phenomenon (such as a temperature).

According to embodiments of the present disclosure, the temperature of the dry-type transformer can be measured accurately, thereby improving the reliability and safety of the dry-type transformer. Accordingly, the temperature measurement for the dry-type transformer can work appropriately in a cost-effective and efficient way.

Figure 3:
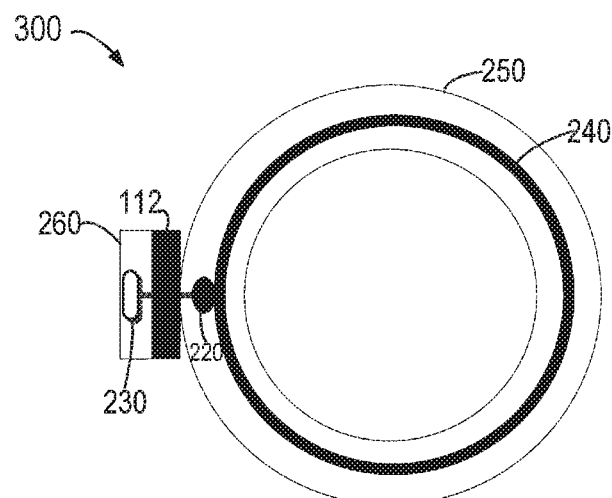
FIG. 3 illustrates a schematic diagram of another environment in which a measuring apparatus is used to measure a temperature of a dry-type transformer.

FIG. 3 illustrates a schematic diagram of another environment 300 in which the measuring apparatus is used to measure a temperature of a dry-type transformer. As shown, the passive wireless communication module 230 may be arranged on or inside a dome area 112 of the HV winding (such as the HV winding 111). As used herein, the dome area represents an area of the HV winding from which wire connecting terminals protrude. Since the dome area 112 is far from the conductor 240, it may have the lower temperature. This protects the passive wireless communication module 230 from being burnt.

Optionally, in some embodiments, the passive wireless communication module 230 may be covered by an insulating layer 260 of the dome area 112 so as to protect the passive wireless communication module 230 and provide aesthetic effect for the dry-type transformer 110. Alternatively, in other embodiments, the dome area 112 can be dug with a groove in which one end of the wire 225 is arranged, and the passive wireless communication module 230 may be arranged inside the groove for connecting the temperature sensor 220 via the wire 225, which can also protect the passive wireless communication module 230 and provide aesthetic effect for the dry-type transformer 110.

Figure 4:
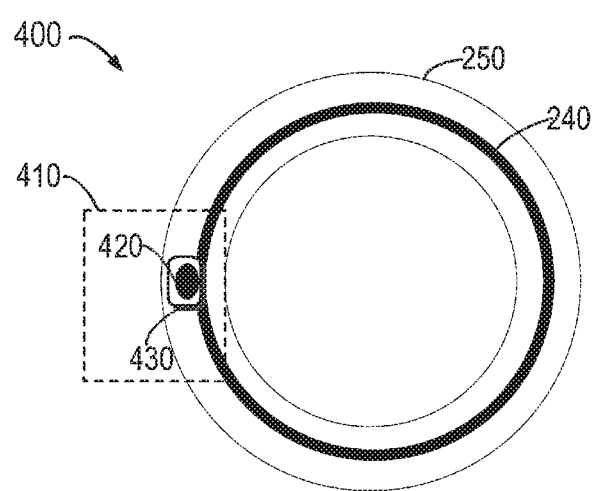
FIG. 4 illustrates a schematic diagram of a further environment in which a measuring apparatus is used to measure a temperature of a dry-type transformer.

FIG. 4 illustrates a schematic diagram of a further environment 400 in which a measuring apparatus is used to measure a temperature of a dry-type transformer. As shown in FIG. 4, the measuring apparatus 410 is arranged on or proximate the conductor 240 so as to measure the temperature of the dry-type transformer. The temperature sensor 420 is packaged inside the passive wireless communication module 430 to form a hard tag measuring apparatus 410, which is more stable.

For example, the passive wireless communication module 430 may be a SAW tag (SAW is chip-less and can withstand high temperature), or a specific type of RFID tag which is heat resistant. Since the SAW tags are identified by frequency band, the maximum number of RAW tags in a measuring system is limited to 12. Compared with SAW tags, there is no limit to the number of RFID tags in a measuring system. To measure the temperature, a terminal of the temperature sensor 420 may be arranged to be exposed outside the passive wireless communication module 430 so as to contact the conductor 240. Moreover, to improve the quality of the wireless communication, the antenna in the passive wireless communication module 430 may be arranged to be faced outside.

In some embodiments, the insulating layer 250 is formed by wrapping an insulating material on the conductor 250 and the passive wireless communication module 430, and the insulating material may be an epoxy resin. In this way, all components of the measuring apparatus 410 may be casted into the insulating layer during the manufacturing of the dry-type transformer, which can protect the measuring apparatus and provide aesthetic effect for the dry-type transformer.

Figure 5:
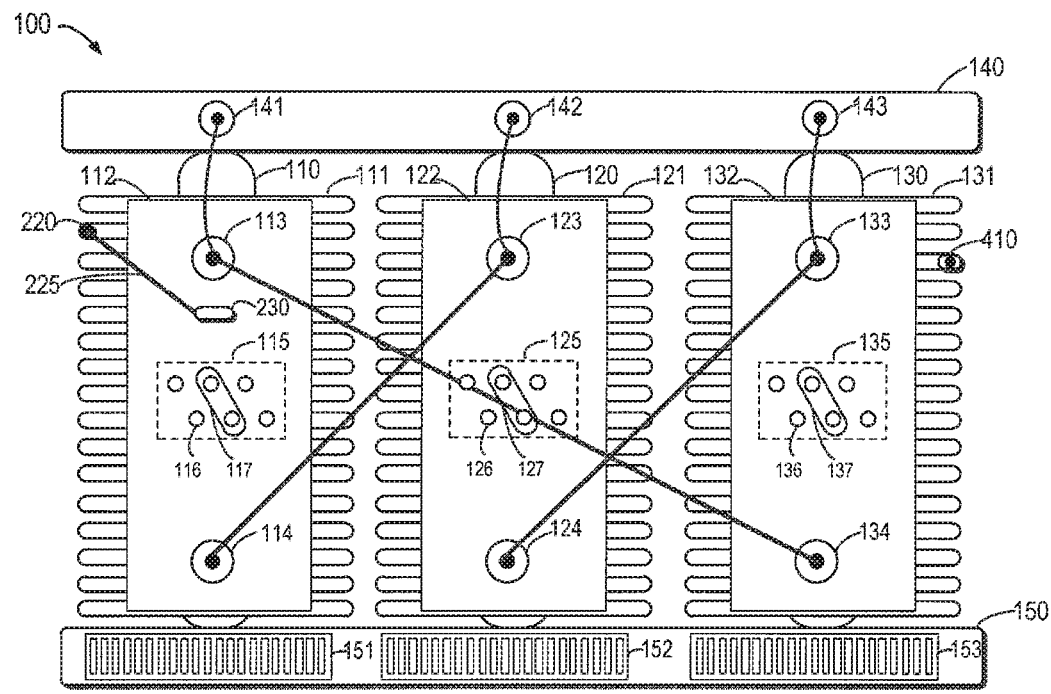
FIG. 5 illustrates a schematic diagram of the dry-type transformer into which the measuring apparatuses have been mounted.

FIG. 5 illustrates a schematic diagram of the dry-type transformer 100 into which the measuring apparatuses have been mounted. As shown in FIG. 5, there are a plurality of (in this case, three) dome areas 112, 122, 132 in the dry-type transformer 100. The dome area 112 comprises wire connection terminals 113, 114 and a tap changer 115 which includes HV tap terminals 116 and HV connection 117, the dome area 122 comprises wire connection terminals 123, 124 and a tap changer 125 which includes HV tap terminals 126 and HV connection 127, and the dome area 132 comprises wire connection terminals 133, 134 and a tap changer 135 which includes HV tap terminals 136 and HV connection 137. Terminals 141, 142, 143, 113, 114, 123, 124, 133 and 134 may be connected through HV connection bars, as shown in FIG. 5.

As shown in FIG. 5, the measuring apparatus 210 as described with reference to FIGS. 2 and 3 and the measuring apparatus 410 as described with reference to FIG. 4 are mounted on the dry-type transformer 100. For example, the temperature sensor 220 of the measuring apparatus 210 may be casted into the insulating layer of the HV winding 111, and the passive wireless communication module 230 of the measuring apparatus 210 may be arranged on the dome area 112, wherein the temperature sensor 220 and the passive wireless communication module 230 are connected via the wire 225.

By arranging the passive wireless communication module 230 on or inside the dome area 112 which has a low temperature, the embodiment as shown in FIG. 5 is especially beneficial where the passive wireless communication module 230 cannot withstand a high temperature such as 180° C. (in this case, the passive wireless communication module 230 may be a RFID tag). This protects the passive wireless communication module 230 from being burnt. For example, the temperature at the temperature sensor 220 may be as high as 180° C., while the temperature at the passive wireless communication module 23 may be lower than 120° C.

In another example, if the passive wireless communication module 430 of the measuring apparatus 410 is heat resistant, it can be directly attached to the HV winding 131 and will not be burnt. In some embodiments, some other measuring apparatuses may be directly glued or tied on the surface of the conductor, or may be located between the discs of the HV winding or LV winding, or may be located on the screw or bus bar of the dry-type transformer 100.

In some embodiments, the passive wireless communication module 230 may be arranged near the tap changer 115 or the wire connection terminal 113 on the dome area 112. In this way, the insulation risk can be reduced.

In some embodiments, since the upper part of the dry-type transformer has a higher temperature than the lower part, temperature sensors 220, 420 may be arranged on an upper part of the HV windings 111, 121, 131 or the LV windings along the cores 110, 120, 130. In this way, the high temperature of the dry-type transformer 100 can be obtained so as to ensure the reliability and safety of dry-type transformer. In some embodiments, some temperature sensors may be also arranged on a lower part of the HV windings or the LV windings for temperature compassion.

In some embodiments, the measuring apparatus may be made of soft material to form a soft tag measuring apparatus, which is suitable for a curved surface of the dry-type transformer 100. In this case, the measuring apparatus may be covered by an insulating layer of the curved surface. It is to be understood that the soft tag measuring apparatus may be also arranged on a flat surface.

Figure 6:
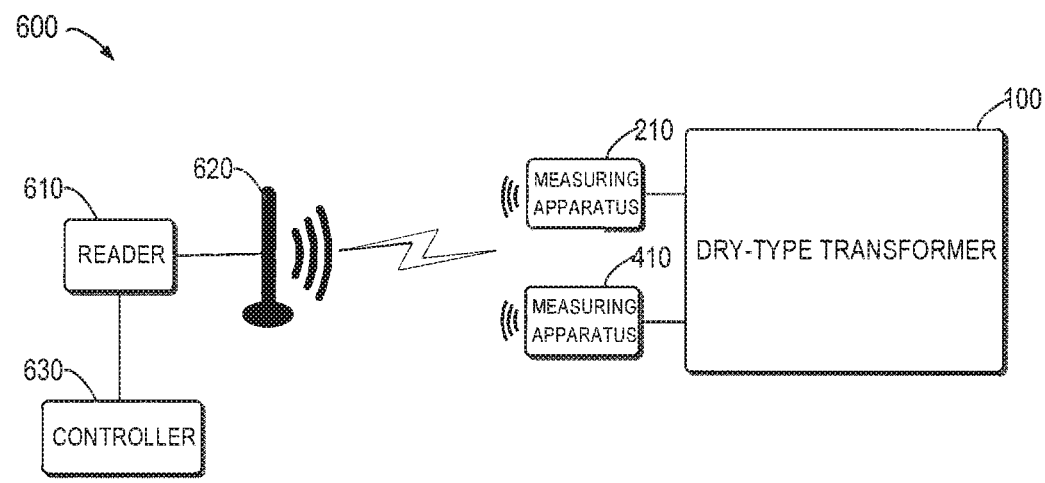
FIG. 6 illustrates a block diagram of a system for measuring a temperature of a dry-type transformer.

FIG. 6 illustrates a block diagram of a system 600 for measuring a temperature of a dry-type transformer. As shown in FIG. 6, the system 600 comprises a reader 610, an antenna 620, measuring apparatuses 210 and 410 according to embodiments of the present disclosure, and the dry-type transformer 100. The reader 610 is configured to provide wireless radio frequency energy to power the measuring apparatuses 210 and 410, and the measuring apparatuses 210 and 410 use the received radio frequency energy to work so as to obtain the temperatures of the dry-type transformer 100. The antenna 620 is connected to the reader via a RF cable or a co-axially cable and is configured to receive the measured temperatures from the measuring apparatuses 210 and 410.

For example, the reader 610 may ask all measuring apparatuses 210 and 410 for electronic product codes (EPCs), the measuring apparatuses 210 and 410 return the EPCs to the reader 610 and start to work. Next, the reader 610 starts to obtain temperatures from the measuring apparatuses 210 and 410, and each measuring apparatus returns the temperature to the reader 610 in real time.

In some embodiments, the reader 610 is arranged inside the dry-type transformer 100, for example, it can be arranged in a LV compartment of the dry-type transformer. In some embodiments, the antenna is arranged on the internal wall or in middle of the dry-type transformer 100 to enable the wireless communications between the antenna 620 and the passive wireless communication modules 230, 430. For example, it is ensured that there is no metal element laid between the antenna 620 and the passive wireless communication modules 230, 430 so as not interrupt the wireless communications.

In some embodiments, the system 600 may comprise a controller 630 to which the reader sends the obtained temperature. For example, the controller 630 may control the operation time and operation status of the reader 610. The controller 630 is configured to, in response to the measured temperature being above a predefined threshold, turn on a cooling device (for example the fan 151, 152 or 153) to decrease the temperature of the dry-type transformer 100. For example, if the temperature sensed by the temperature 220 is too high, the controller 630 may turn on the fan 151. In some embodiments, the controller 630 may be a computing device in local or in a cloud.

It is to be understood that although two measuring apparatuses are shown in FIG. 6, the system 600 may include less or more measuring apparatuses. Moreover, to improve the communication quality in the case of a large amount of measuring apparatuses, multiple antennas located at different locations of the dry-type transformer may be provided in the system 600.

In some embodiments, the measuring apparatus of the present disclosure may be used to measure a temperature of the dry-type transformer. Measuring apparatus according to the embodiments of the present disclosure can be used to monitor the temperature of the dry-type transformer intelligently, and temperature changes at different locations can be also monitored quickly and accurately.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A measuring apparatus comprising: a temperature sensor configured to measure a temperature of a dry-type transformer, the temperature sensor being arranged on or approximate to a conductor of the dry-type transformer and being covered by an insulating layer of the conductor; and a passive wireless communication module configured to transmit the measured temperature to a reader,
    wherein the insulating layer is formed by wrapping an insulating material on the conductor and the temperature sensor,
    wherein the conductor is a part of the followings: a high voltage winding of the dry-type transformer, a low voltage winding of the dry-type transformer, a core of the dry-type transformer, and a tap terminal of the dry-type transformer, and wherein insulating material includes an epoxy resin,
    wherein the passive wireless communication module is connected to the temperature sensor via a wire, and one end of the wire protrudes from the insulating layer,
    wherein the passive wireless communication module is arranged on or inside a dome area of the HV winding, and preferably, near a tap changer or a wire connection terminal on the dome area.

2. The measuring apparatus according to claim 1, wherein the temperature sensor is arranged on an upper part of the HV winding or the LV winding along the core.

3. The measuring apparatus according to claim 1, wherein the passive wireless communication module is covered by an insulating layer of the dome area, or arranged inside a groove of the dome area, and a part of the wire is arranged in the groove for connecting the passive wireless communication module and the temperature sensor.

4. The measuring apparatus according to claim 1, wherein the temperature sensor is connected to the conductor via a thermally conductive layer within the insulating layer.

5. The measuring apparatus according to claim 1, wherein the temperature sensor is packaged inside the passive wireless communication module, and a terminal of the temperature sensor is exposed outside the passive wireless communication module, and wherein the insulating layer is formed by wrapping an insulating material on the conductor and the passive wireless communication module and wherein the insulating material includes an epoxy resin.

6. The measuring apparatus according to claim 1, wherein the measuring apparatus is made of soft material and arranged on a curved surface of the dry-type transformer, preferably covered by an insulating layer of the curved surface.

7. The measuring apparatus according to claim 1, wherein the passive wireless communication module includes a passive radio frequency identification (RFID) tag or a surface acoustic wave (SAW) tag.

8. A system comprising: a measuring apparatus according to claim 1; the reader; and the dry-type transformer.

9. The system according to claim 8, wherein the reader is arranged inside the dry-type transformer in a low voltage (LV) compartment of the dry-type transformer.

10. The system according to claim 8, wherein the reader is configured to provide wireless radio frequency energy to power the measuring apparatus-via one or more antennas.

11. The system according to claim 8, further comprising: one or more antennas configured to receive the measured temperature from the passive wireless communication module, at least one of the one or more antennas being arranged in middle of the dry-type transformer to enable a wireless communication between the at least one antenna and the passive wireless communication module.

12. The system according to claim 8, further comprising: a further measuring apparatus according to claim 1 arranged at a different location from the measuring apparatus.

13. The system according to claim 8, further comprising: a controller configured to, in response to the measured temperature being above a predefined threshold, turn on a cooling device to decrease the temperature of the dry-type transformer.

14. A method for installing a measuring apparatus, comprising: assembling the temperature sensor of the measuring apparatus according to claim 1 to a surface of a conductor of a dry-type transformer; and wrapping an insulating material on the conductor and the temperature sensor such that the temperature sensor is non-detachable.

15. A method for detaching a measuring apparatus, comprising: detaching the passive wireless communication module of the measuring apparatus-according to claim 1 from a groove of a dome area; assembling a new passive wireless communication module in the groove of the dome area; and connecting the new passive wireless communication module to a wire which is arranged in the groove.

* * * * *